United States Patent [19]

Pugsley

[11] 3,893,166

[45] July 1, 1975

[54] COLOUR CORRECTING IMAGE REPRODUCING METHODS AND APPARATUS

[75] Inventor: Peter C. Pugsley, Pinner, England

[73] Assignee: Crosfield Electronics Limited, London, England

[22] Filed: May 9, 1974

[21] Appl. No.: 468,385

Related U.S. Application Data

[63] Continuation-in-part of Ser. No. 321,118, Jan. 5, 1973, abandoned.

[30] Foreign Application Priority Data

Jan. 5, 1972 United Kingdom .................. 478/72

[52] U.S. Cl. .................................................. 358/80
[51] Int. Cl. ............................................... G03f 3/08
[58] Field of Search .................... 358/75, 78, 79, 80

[56] References Cited

UNITED STATES PATENTS

| | | | |
|---|---|---|---|
| 2,434,561 | 1/1948 | Hardy et al. | 358/80 |
| 2,790,844 | 4/1957 | Neugebauer | 358/80 |
| 3,521,245 | 7/1970 | Rogers | 340/173 R |
| 3,600,505 | 8/1971 | Dobouney | 358/80 |
| 3,612,753 | 10/1971 | Korman | 358/80 |
| 3,745,243 | 12/1971 | Seitz | 358/78 |

*Primary Examiner*—Richard Murray
*Assistant Examiner*—Michael A. Masinick
*Attorney, Agent, or Firm*—Kemon, Palmer & Estabrook

[57] ABSTRACT

In the reproduction of a coloured original using a photo-electric scanner to derive colour component signals, corrected output values of the colour component signals are obtained from a store which has been loaded with corrected values in a preliminary operation by a computer programmed in accordance with a desired store input-output relationship and using preset parameter values.

7 Claims, 6 Drawing Figures

COLOUR CORRECTING IMAGE REPRODUCING METHODS AND APPARATUS

This application is a continuation-in-part of Ser. No. 321,718, filed Jan. 5, 1973, now abandoned.

In a colour scanner for the graphic arts some form of computer is required to convert signals derived from the scanner photomultipliers or photocells into signals which, when applied to the output means of the scanner, will give rise to colour separations or plates which will result in a printed image which is an acceptable reproduction of the original subject. To this end the computer must modify the signals in a manner which takes into account the characteristics of the input and output means of the scanner, the tone or gradation curve appropriate to the particular subject to be scanned, the absorptions and printing characteristics of the ink, and the editorial modifications to the original subject which may on occasion be required.

In a typical known colour computer, the three colour-representing input signals from the photomultipliers are applied in turn to a range compression unit, a colour correction unit, and a black printer and under-colour removal unit providing four output signals, then through a selector switch for selecting one colour signal or black to a tone control unit for the selected colour, and an exposure range adjusting unit. The resulting signal controls the intensity of an exposing lamp in a scanning exposing head.

It is a known disadvantage of such a computer that the adjustments are not independent. This is because some units are designed to have a combined function in order to avoid undue complexity of hardware. For example, the tone control unit in the above list serves both to generate the required subjective tone curve for the subject and to compensate for the ink printing curve. It is not possible to adjust for changes in each of these independently.

Theoretically, it would be more desirable to apply the colour-representing input signals from the photomultipliers to a succession of stages providing the following series of functions (it should be understood that even further elaboration is possible and theoretically desirable):

1. Compensation for characteristics of photomultipliers, filters, etc.
2. Tone compensation for transparency range, material and subject.
3. Transparency colour correction.
4. Optional editorial colour changes: the output signals from this stage have levels representing the desired print colour in any convenient co-ordinate system.
5. Colour correction for ink absorptions, trapping, etc.
6. Black printer and under-colour removal: the levels of the four output signals represent the equivalent neutral density of the inks.
7. Ink grey balance and printing curve: the output signal levels represent the "percentage dot."
8. Exposing lamp and film curve compensation.

The resulting signals are applied to a selector switch which selects any of four signals, the selected signal being used to modulate the exposing lamp.

Such a computer, in which the functions are performed by independent blocks, would not be practical if realised in conventional analogue circuits owing to the complexity and unreliability and the likelihood of missetting some of the large number of control knobs. It could in principle be realised by sampling and digitising each input point, and performing the computation on each picture element upon a digital computer. Owing to the number of arithmetic operations to be performed to obtain each picture element, such a method would be impractical on a modern high speed scanner unless a large and expensive high speed computer were used.

In another known approach to the problem, the colour computer is dispensed with, and instead a store (typically a ferrite-core digital store) is used to store the desired renderings of a large number of colour points, and appropriate points are extracted as required during scanning. The store is loaded with suitable information by scanning a printed colour chart generated by known arbitrary signals. This method has the disadvantage that it is not easy to enter changes of desired transparency rendering into the system. Further if it is desired to change temporarily from one set of printing conditions (e.g. inks) to another, either a large amount of data must be stored or a colour chart must be rescanned each time a change is made.

The present invention enables the flexibility and ease of adjustment of a computer of the ideal kind discussed above to be combined with the operating speed and repeatability of a stored-sample system.

A method according to the present invention includes programming a digital computer to effect tone and colour correction of colour-component signals applied thereto and to provide tone and colour corrected output signals; adjusting parameter-setting means to define parameters used by the digital computer in correcting the colour-component signals; supplying the computer with a matrix of input signal combinations, each input signal representing a colour component and each combination representing a point in colour space, and transferring corresponding output signals from the computer to a store, whereby the store contains a matrix of tone and colour corrected signals corresponding to the said input points in colour space; scanning the original with a photo-electric scanner to obtain signals representing colour component densities of successively scanned elements of the original; interrogating the store to derive tone and colour corrected store output signals corresponding to the signals from the scanner; and using the signals from the store to control the treatment of an output surface on which the original is to be reproduced. Preferably, the store uses digital signals representing the colour component densities as addresses of store locations at which the corresponding output values are found. The relationship between the output and input values of the store may be such as to take into account all the above-mentioned functions; alternatively, the store may be split into two parts, each part having an output-input relationship taking into account some of the functions, the two stores acting in a complementary manner. This is useful where the signals from the analysing scanner are recorded before being used to control the output scanner.

The treatment of the output surface may be exposure to a light beam (conventional or laser) if the output surface is a light-sensitive sheet, or to an electron beam; the treatment may also be working with a tool, point to point, for example an engraving tool. The digital store may be part of the computer's own memory or may be provided separately. The image to be reproduced may be a transparency or may be reflection copy.

The parameter values may be obtained by placing an image to be reproduced in the scanner, displaying the value of the scanner output corresponding to a selected point or points on the image, and adjusting parameter controls to obtain a desired output or outputs for the selected point or points on the image. Alternatively, the image density may be measured on a colour densitometer or colourimeter; the required parameter values may be known from the resulting measurements or, if necessary, a computer can be used to work out the parameter values on the basis of the measurement results.

In order that the invention may be better understood, one example of apparatus embodying the invention will now be described with reference to the accompanying drawings, in which.

Figure 1:
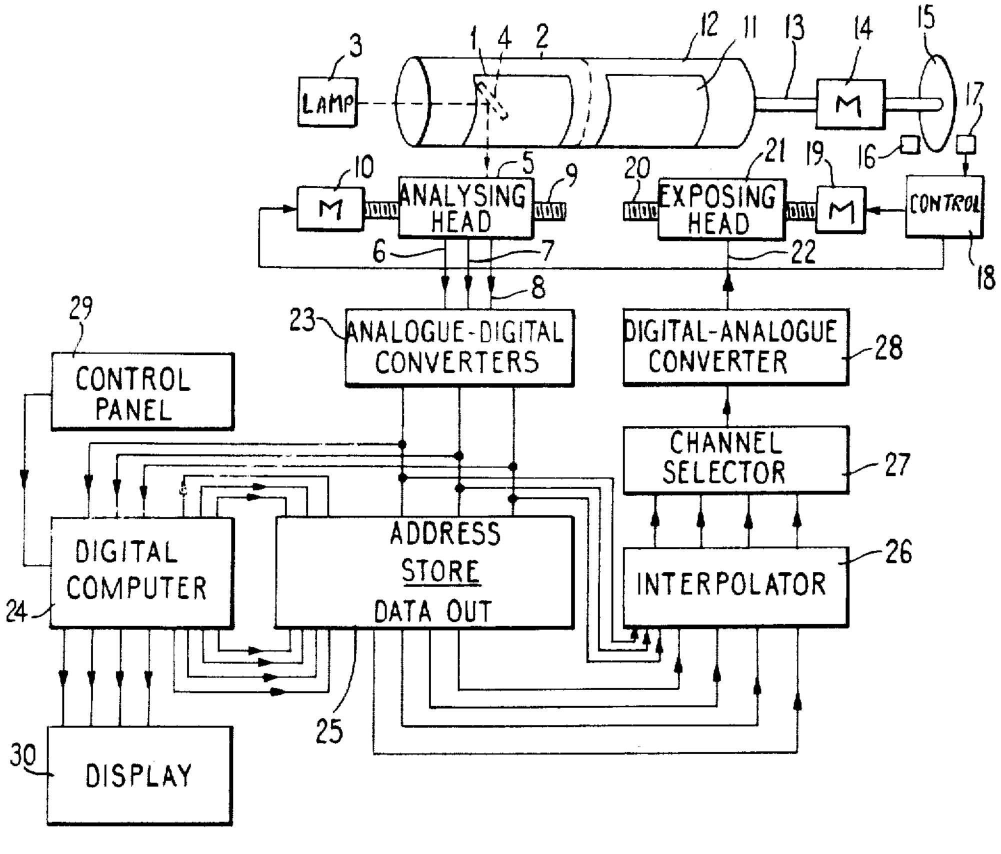
FIG. 1 is a block diagram of a first form of apparatus embodying the invention.

In FIG. 1, a transparent original 1 to be reproduced is wrapped around the surface of a transparent drum 2. A xenon lamp 3 directs light rays into the drum and on to a 45° mirror 4, from which the rays pass through the wall of the drum and through the transparent original 1. These light rays reach an analysing head 5 containing colour filters and photo-electric devices such that signals representing the red, blue and green densities of the scanned element of the picture 1 are produced on lines 6, 7 and 8 respectively. Because printing is carried out in subtractive colours, the lines 6, 7 and 8 will be said to be part of the cyan, yellow and magenta colour channels. The analysing head 5 is mounted on a lead screw 9 which is driven in synchronism with the rotation of the drum 2 by a motor 10. As a consequence, the analysing head sees a point on the drum 2 which, as the drum rotates and the analysing head moves along its lead screw, traces out a helical path along the drum 2 and consequently traces out a number of parallel scanning lines on the original 1.

A light-sensitive sheet 11 to be exposed is mounted on a drum 12 which, in this case, is an extension of the drum 2. Both drums are mounted on a shaft 13 driven by a motor 14. The motor also drives a slotted disc 15, the slotted periphery of which rotates between a light source 16 and a photo-electric cell 17. Pulses derived from the photo-electric cell 17 are applied to a control unit 18 which controls the rotation of the motor 10, driving the lead screw for the analysing head, and a motor 19 which drives a lead screw 20 on which is mounted an exposing head 21. The control unit includes frequency dividing and multiplying circuits selected to achieve the desired rates of rotation of the lead-screw motors in synchronism with the rotation of the disc 15. The exposing head 21 includes a light source which traces out a helical pattern on the drum 12 and which is modulated by a signal on a line 22. This signal is derived from the input signals on lines 6, 7 and 8 in the following manner.

The signals on the line 6, 7 and 8 are first applied to analogue-digital converters 23, the digital outputs of which can be connected to a digital computer 24 and also to a digital store 25 and an interpolator 26. The store 25 uses the three digital signals from the converters 23 as address signals and provides at its output signals which are stored in the location represented by that address. In the example shown, the interpolator permits the required output-input relationship to be maintained for increments finer than would be permitted by the store 25, as will be described. The store 25 and the interpolator 26 are such that they provide three output signals representing the cyan, yellow and magenta printer values and also a fourth signal representing a black printer value. A channel selector 27 rceives the four signals and selects the one which corresponds to the separation to be made with the light-sensitive sheet 11. This signal is converted into analogue form in the converter 28 and is then used to modulate the light source in the exposing head 21.

For the preliminary loading of the store with the matrix of output values, a control panel 29 enables parameter values to be set up in accordance with the system characteristics and the characteristics of the original to be reproduced. These parameter values are entered into the digital computer, which is programmed to provide the required output-input relationship. A display 30 permits the effect of this relationship and the effect of the parameter settings to be inspected before the matrix of output values is calculated by the computer 24 and entered into the store 25.

Figure 2:
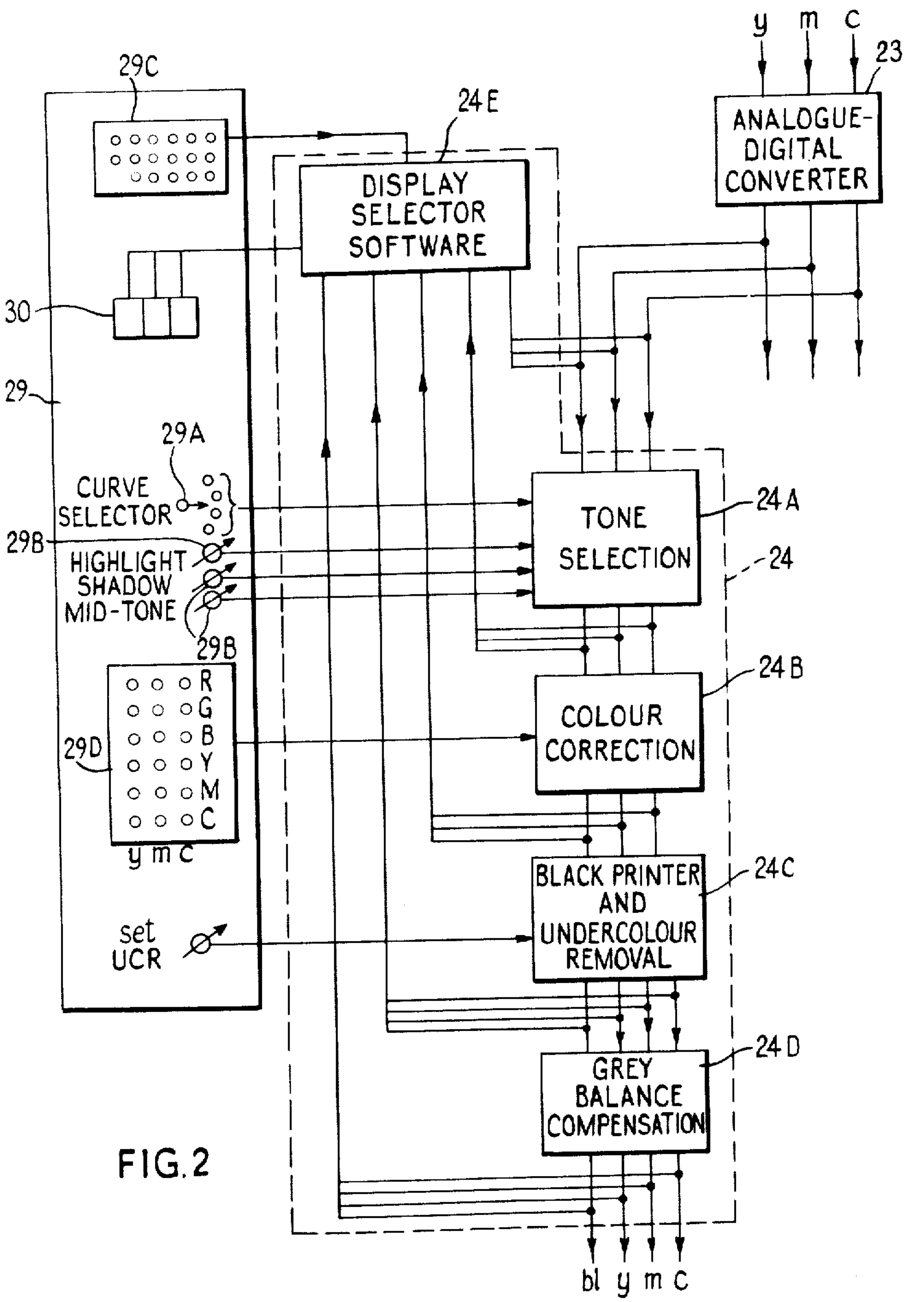
FIG. 2 is an expanded diagram illustrating the operation of the apparatus in its setting-up mode.
Figure 5:
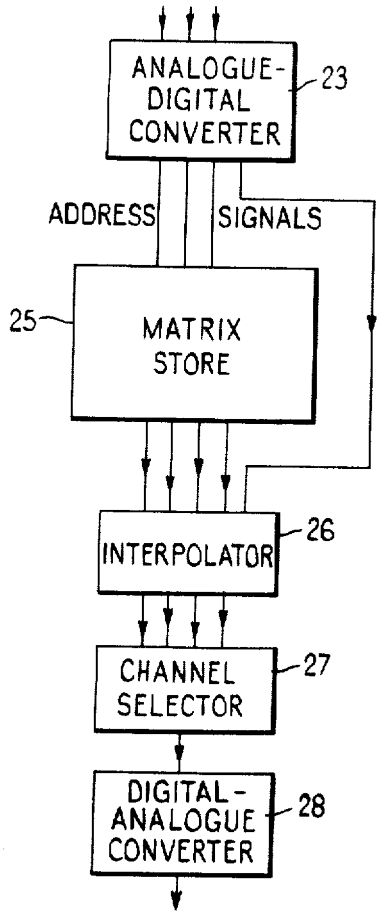
FIG. 5 illustrates the operation of the signal-processing part of the apparatus during scanning of an original.
Figure 4:
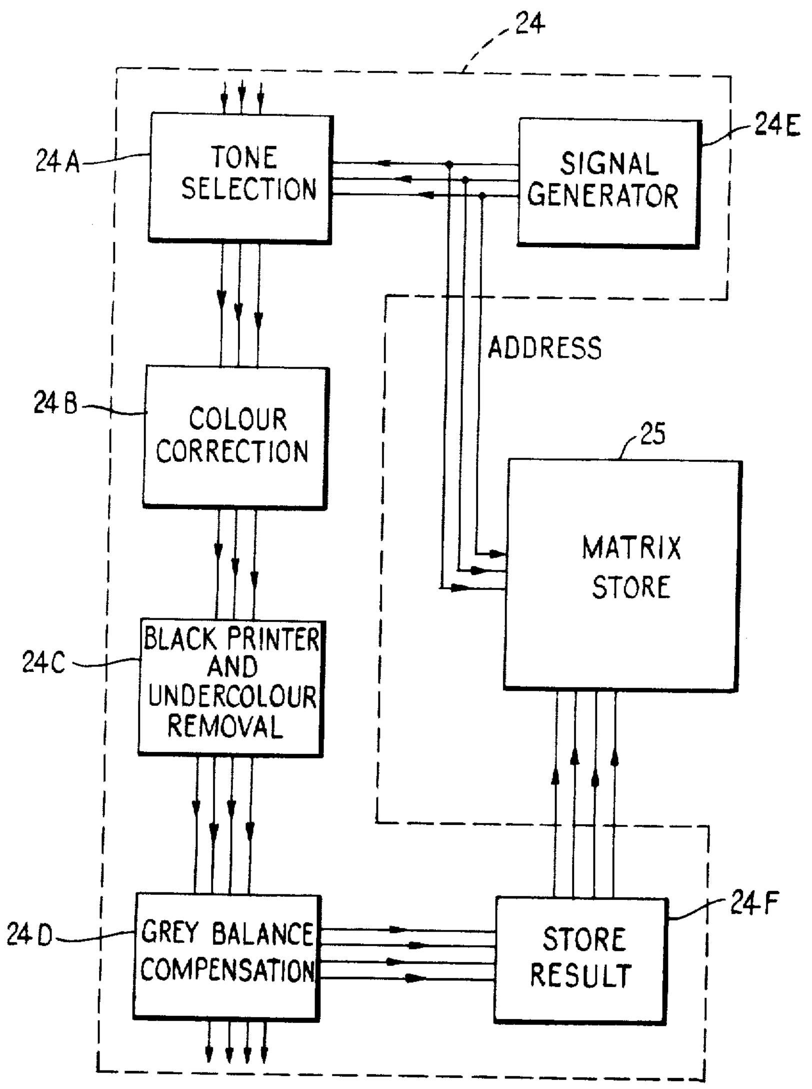
FIG. 4 illustrates the operation of the apparatus in its store loading mode.

FIGS. 2, 4 and 5 illustrate the operation of the apparatus in three different modes, namely the setting-up mode, the store loading mode and the scanning mode; they also illustrate the computer programme used in the processing of the colour-component signals. Briefly, the computer stores different tone characteristic curves and the control panel permits the selection of one of these curves and permits the end points of the selected curve to be shifted; the programme causes input data to be processed in accordance with the selected curve. Additionally, the computer stores basic colour correction data and the control panel permits "editorial" modification of the colours, the programme causing input data to be processed in accordance with the resulting colour modification characteristics. The computer programme also causes the calculation of a black printer signal from input signals and the removal of undercolour from those signals; the control panel permits the degree of undercolour removal to be adjusted. Finally, the computer stores grey balance compensation curves and the computer programme causes input data to be processed in accordance with these curves.

Turning now to FIG. 2, in the setting-up mode of operation, the parameters used in the computer are adjusted to suit the subject which is about to be scanned. First, the original to be scanned is inspected and on the basis of the tonal variation of this original, one of a number of tonal characteristics, which have been preloaded into the computer, is selected by means of the switch 29A. These curves govern the general shape of the tone characteristic and may be of the form shown in FIG. 2 of our British Pat. No. 1,236,377. Next, the output values for highlight and shadow areas, and possibly for mid-tone areas, are inspected and modified if necessary. As an example, if the selected tone characteristic is a linear modification of some arbitrary curve $F_R$ the expression loaded into the computer will be of the form $y = F_n(ax + b)$. Assuming that a transparency density range of 0 to 3.0 is to be compressed to a reflection density range of 0 to 1.8, it may be that for the coloured original in question, it is desired to reproduce all high-light transparency densities up to 0.5 by the minimum density in the reflection range; similarly, it may be required to set the shadow terminal point of the transparency density range at 2.6, for example, so that all density values above this will be reproduced by the maximum reflection density. These values are set into the computer by means of the highlight and shadow controls and permit the computer to derive values of $a$ and $b$ in the above-mentioned equation.

It will be realised that the form of the equation may be more complex; for example, it may be a quadratic equation requiring the setting of a mid-tone control to provide the computer with a sufficient number of inputs for the values of the "constants" to be derived.

To adjust selected points on the tone characteristic in the manner described above, the analysing head is directed at selected points on the coloured original. When the analysing head is directed at a point on the original, whether both are stationary as during the setting-up procedure or there is relative movement between them as during a scanning operation, the analysing head generates signals representing the colour components of the inspected part of the original. Thus, in this example the analysing head 5 of FIG. 1 generates blue-filter, green-filter and red-filter colour component signals, corresponding respectively to the yellow, magenta, and cyan ($y$, $m$, and $c$) printer signals. Before conversion to digital form, the photomultiplier signals which are proportional to original transmittance or reflectance may be passed through logarithmic amplifiers to obtain signals proportional to density. Alternatively a modified logarithmic characteristic may be used the object being in either case to distribute the quantising steps of approximately digital signal in a subjectively approxiately uniform manner over the visual range. These signals are then converted from analogue to digital from in the circuit 23 and the resulting digital signals are applied to the computer 24, in which they are operated upon in a first software stage 24A for tone characteristic selection.

The control panel 29 includes a selector panel 29C co-operating with a display selector software stage 24E in the computer. The software stage 24E in effect scans pushbuttons on the panel 29C to ascertain what display is required and supplies the appropriate signal to the display 30. In this way, the value of any of a number of signals can be presented in digital form on the display 30. In the example which is being described, it is possible to display the outputs of the analogue-to-digital converter 23 and also the outputs of the tone characteristic selection stage 24A of the computer. With this arrangement, the value of any colour-component signal at the input of the tone selection stages can be displayed, as can the value of the signal at the output of the tone selection stage, so that the effect of variations introduced by the operator's controls can be seen.

To adjust selected points on the selected tone characteristic in the manner described above, the scanning drum 2 and the analysing head 5 are relatively moved, by rotation of the drum and longitudinal movement of the scanning head, until the scanning head is directed at a first point of interest on the original to be reproduced, for example at a highlight on this original. The values of the colour-component signals at the output of the tone selection stage software are displayed and the highlight control is adjusted until the displayed values are as required for the reproduction of a highlight in the copy. Next, the scanning drum and analysing head are relatively moved until the head is directed at a shadow area on the original and the shadow control 29B is adjusted until the value of each colour-component signal at the output of the tone selection stage, as shown on the indicator 30, is as required. As explained above, for non-linear tone characteristics it may also be desirable to select a mid-tone portion of the original and to adjust the mid-tone control 29B for an appropriate value.

Next, the tone-corrected signals are subjected to colour correction. Colour correction has two functions, one of which is to compensate for colour non-linearities of the inks used in the reproduction process in super-position and for any errors arising from filters used in the input scanner; the other function of colour correction is to permit an operator to deliberately modify a colour in the reproduction so as to make it different from the colour in the original. This latter form of colour "correction" is frequently needed for advertising purposes. Basic colour correction is stored in the computer software stage 24B but can be modified ("editorial correction") by means of the controls on the sub-panel 29D of the control panel 29.

The form of colour correction used in the present application is the digital equivalent of that described in detail in our U.S. Pat. No. 3,600,505. In that patent specification, we describe the derivation of six "single colour" signals from the three input signals, the six single colours representing magenta, violet, cyan, green, yellow and red. Each of the colour printer channels (yellow, magenta and cyan) has six controls, one for each of these single colours. As an example, for the yellow printer channel, the cyan, violet and magenta single-colour controls are used to decrease yellow in areas of those colours and the red, yellow and green single-colour controls are used to increase yellow. For this reason, on the control panel 29D there are 18 controls. In view of the detailed disclosure in this U.S. Pat. No. 3,600,505 and in view of the fact that the computer software stage 24B is the digital equivalent of the analogue circuits described in that specification, it is believed that the writing of a programme suitable for carrying out basic correction and providing for editorial modification of the colour signals would not present difficulty to one skilled in the art and that no further description is necessary in the present specification.

As before, signals derived from the colour-corrected signal channels can be selected by means of the display selector 29C and presented on the indicator 30.

The colour corrected signals are applied to a software stage 24C in which a black printer signal is derived from them and undercolour removal is carried out. As is well known, the process of producing a black printer signal involves determining which of the colour channels has the minimum colour component value and using this value, or a proportion of it, to derive the black printer signal. The colour-component signals are then reduced by the amount of the black printer signal (or a proportion of it), this being known as "undercolour removal." Thus, the software for this operation has only to select instantaneously the minimum of three signals, to generate a fourth signal equal to this minimum value or a proportion of it, and to subtract this minimum value or a proportion of it from each of the first three signals. The proportion to be subtracted is set by means of the "set UCR" control on the input control panel 29.

Figure 3:
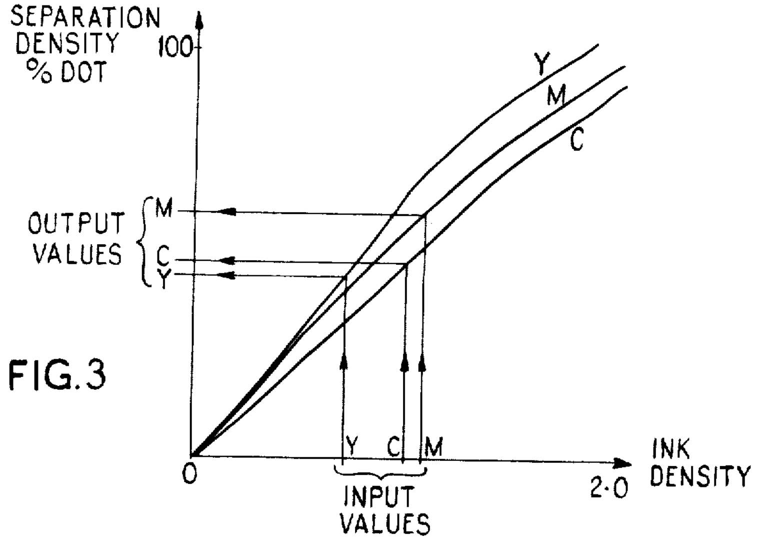
FIG. 3 illustrates the operation of the grey balance compensation portion of the computer.

Next, the three colour-component printer signals are subjected to grey-balance compensation in a software stage 24D. In the equipment which is being described, equal values of the yellow, cyan and magenta colour channel signals at the outputs of the colour correction circuit and at the colour-component outputs of the black printer generating circuit would represent a grey on the original; however, generally speaking, unequal amounts of inks are required to print grey in the reproduction. Consequently it is necessary for the computer to be preloaded with grey-balance characteristics. An example of one set of grey-balance characteristics is shown in FIG. 3, from which it will be seen that equal input values (ink density values) are required to produce different output values (representing percentage dot separation density) to provide grey in the reproduction. As an example, a number of co-ordinate points for the curves can be stored in the computer and well-known mathematical formulae can be used in an interpolation programme to derive intermediate values. No input panel controls are provided for grey-balance compensation because this is not normally adjusted unless a different ink or set of inks is to be used to print the reproduction; in such a case, new curves or co-ordinate points can be preloaded into the computer by means of punched paper tape or alternative sets of curves or co-ordinates for different sets of inks can be permanently stored in the computer and a selection can be made according to the set of inks in use for each operation.

The black printer ink density values are converted into percentage dot values by means of a stored characteristic in the grey-balance compensation circuit.

The values of the three colour-component printer signals and the black printer signal can be presented on the display indicator 30 by means of the display selector 29C.

The software stages shown permit tonal and colour correction and modification to be carried out. It may also be necessary to include an input calibration software stage and it is generally necessary to include an output calibration software stage, following the grey balance compensation stage. The output calibration software stage can be used to take account of day-to-day variations of the separation film processor, variations of exposing lamp intensity and variations between the different contact screens used. The input and output calibration stages effectively provide the inverse of the variations occurring in the corresponding scanner. An input calibration software stage would be required for example, if the photomultiplier or preamplifier characteristics were likely to change. Such a calibration stage would not normally have connections to the control panel; the change of calibration would be entered into the computer from punched paper tape.

When the operator is satisfied with the effect of the adjustments he has made, the apparatus is set to its store-loading mode of operation. This is illustrated in FIG. 4 and involves only the computer 24 and the matrix store 25. The matrix store 25 is utilised in such a manner that the addresses of the different store locations represent different points in three-dimensional colour space. Thus each location represents a particular input colour and signals loaded into this location represent the required colour-component output signals for that input colour.

A further stage of software (the signal-generator stage 24E) in the computer now generates a succession of combinations of three input signals, each combination representing a matrix store address and, as explained above, also representing three colour-component values which define a point in three-dimensional input colour space. Each combination of three signals is applied as an address to the store 25. The three signals are also applied as colour-component channel signals to the chain of software stages discussed in connection with FIG. 2, namely the tone-characteristic selection stage, the colour correction stage, the black printer and undercolour removal stage and the grey-balance compensation stage. If an input calibration stage and an output calibration stage are also included in the computer software, the signals will pass through these stages also. The software corresponding to these different stages acts upon the generated signals from stage 24E, using the parameters previously set up by means of the control panel 29 (FIG. 2); as a result, four printer signals are produced following the grey-balance compensation stage 24D. A final stage 24F of computer software causes the signals following the grey-balance compensation operation to be directed to the matrix store 25, in which they are stored at the location the address of which is represented by the input signals generated by the signal generator stage 24E. Each successive combination of three generated signals is treated in this way, its corresponding four-signal output combination being stored at the location whose address is represented by the input signal combination. A large number of output signal combinations corresponding to samples of points in three-dimensional input colour space of interest are loaded into the matrix store 25 for use in the subsequent scanning operation.

The third mode of operation of the apparatus is the scanning mode, illustrated in FIG. 5. In this scanning mode, the analysing scanner carries out a scanning operation in relation to the coloured original and generates analogue signals representing the yellow, cyan and magenta printer colour components, in the usual way. These signals are converted to digital form in the converter 23 and are then applied as address signals to the matrix store 25, which has been preloaded in the manner described in connection with FIG. 4. Signals corresponding to the values stored in an addressed location of the matrix store appear at the store output. It will be appreciated that these signals are functions of the input signals incorporating all the corrections and characteristics provided by the software in the computer.

Figure 6:
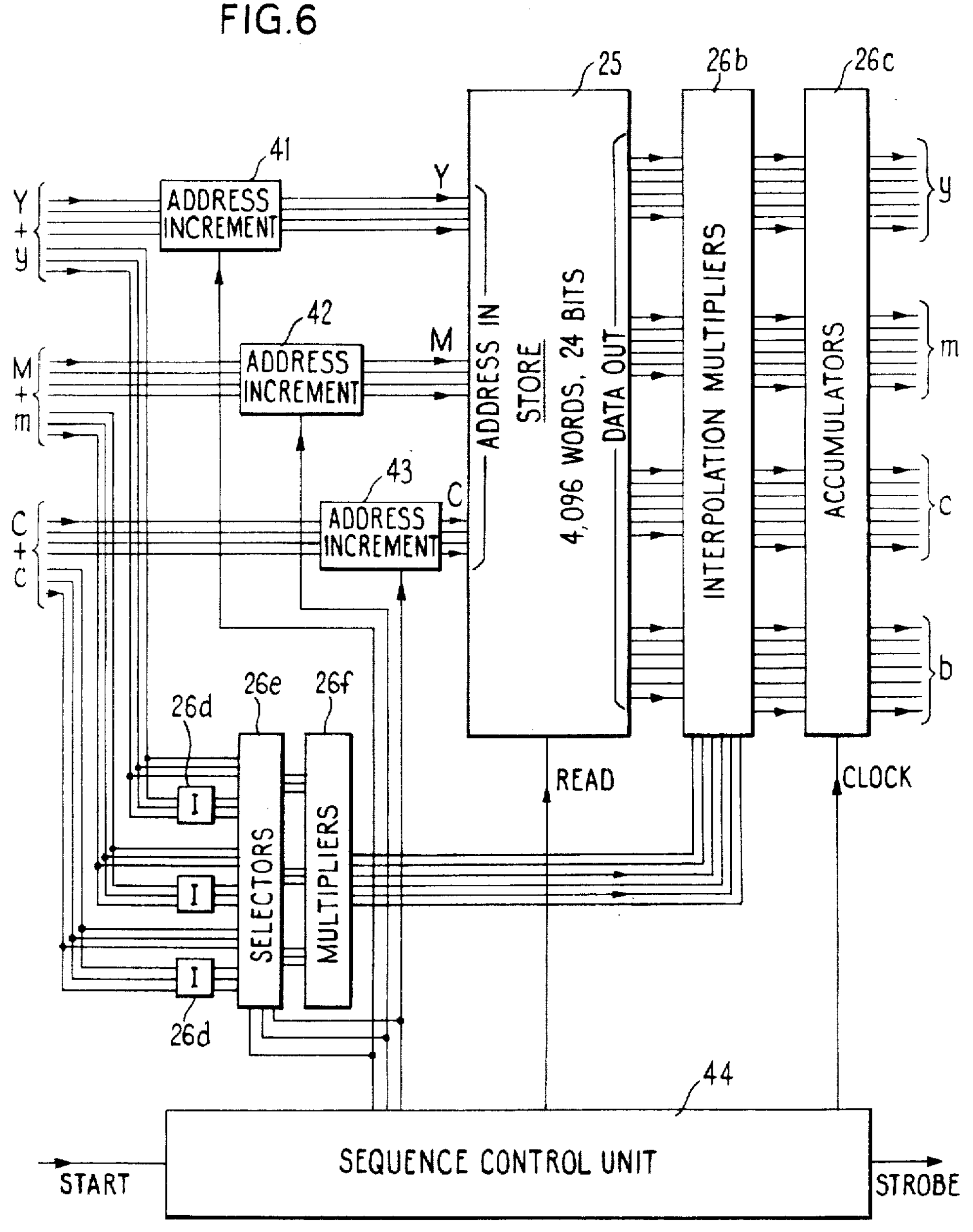
FIG. 6 is an expanded block diagram of the store and interpolator.

The interpolator shown in FIG. 1 is necessary when, as will usually be the case, the number of possible different picture elements exceeds the number of addresses which it is reasonable to provide in the store. For example, in high quality work each photomultiplier signal may be coded into seven digits of pure binary code. This would require a total of $2^{21}$ addresses, i.e., about two million. FIG. 6 shows an interpolator which reduces the requirement to 4,096 addresses by linear interpolation in three dimensions. For simplicity the black printer signal will be ignored.

As shown in FIG. 6, the four coarsest digits of each channel are used to address the store 25 and the three finest to control interpolation. The addresses are transmitted to the store via controllable increment devices 41, 42 and 43 each capable of adding one when demanded. The store is interrogated eight times for each picture element by a sequence control unit 44. The eight data points lying nearest to the input picture element are obtained. In three-dimensional input colour space these are the corners of a cube surrounding the input point. The complexity of the interpolation arises from the fact that the three channels are not independent. For example, a 'Y' value does not by itself define an address in the store. A group of three values, Y, M, C is needed to define a single address in the store. At that one address will be found the corresponding output values (three, or four if a black printer is required).

For generality, let us call the three dimensions of input space $m$, $y$, $c$ and of output space $\overline{m}$, $\overline{y}$, $\overline{c}$.

Let the input point be (M+$m$, Y+$y$, C+$c$) where M, Y and C are the whole-address parts and $m$, $y$ and $c$ the parts to be interpolated.

In the example of FIG. 5, M, Y and C are of 4-bit length (i.e., decimal integer 0 to 15) and $m$, $y$ and $c$ are of 3-bit length (i.e., 0, ⅛ ¼ . . . ⅞).

Addressing the store at M, Y, C gives the output point $\overline{M}$, $\overline{Y}$, $\overline{C}$. It will be appreciated that $\overline{M}$, $\overline{Y}$ and $\overline{C}$ may be of any length, depending on the resolution required; in the example shown in FIG. 5, they are of 6-bit length.

The output point ($\overline{M+m}$, $\overline{Y+y}$, $\overline{C+c}$) is obtained by the following linear interpolation.

$$
\begin{aligned}
\overline{M+m} = {} & \overline{M}_{M,Y,C}(1-m)(1-y)(1-c) \\
& + \overline{M}_{M,Y,(C+1)}(1-m)(1-y)c \\
& + \overline{M}_{M,(Y+1),C}(1-m)y(1-c) \\
& + \overline{M}_{M,(Y+1),(C+1)}(1-m)yc \\
& + \overline{M}_{(M+1),Y,C}\,m(1-y)(1-c) \\
& + \overline{M}_{(M+1),Y,(C+1)}\,m(1-y)c \\
& + \overline{M}_{(M+1),(Y+1),C}\,my(1-c) \\
& + \overline{M}_{(M+1),(Y+1),(C+1)}\,myc
\end{aligned}
$$

The notation $\overline{M}_{M,Y,C}$ denotes the $m$ component of data stored at address (M,Y,C). $\overline{Y+y}$, $\overline{C+c}$ are obtained similarly. For example $$
\begin{aligned}
\overline{Y+y} = {} & \overline{Y}_{M,Y,C}(1-m)(1-y)(1-c) \\
& + \overline{Y}_{M,Y,(C+1)}(1-m)(1-y)c \\
& + \ldots\ldots\ldots\ldots \text{etc.}
\end{aligned}
$$

The interpolation multiplier 26*b* is required to multiply the data word (e.g. $\overline{M}_{(M+1)(Y+1)(C+1)}$) from the store by a coefficient such as those listed above, e.g., $m\ y\ c$. This coefficient and the similar coefficients involving the terms ($1-m$), ($1-y$) and ($1-c$) are generated by the circuits 26*d*, 26*e* and 26*f*. The circuits 26*d* generate the complements of the incoming terms $m$, $y$ and $c$, that is to say they generate ($1-m$), ($1-y$) and ($1-c$). Since the digital values are in binary form, the circuits 26*d* are in fact inverter circuits.

The selector circuits 26*e* under the control of the sequence control unit 44 successively select the different combinations of the signals applied to them which go to make up the above-mentioned coefficients, for example ($1-m$)($1-y$)($1-c$), ($1-m$)($1-y$)$c$, ($1-m$)$y$($1-c$), and so on. In synchronism with the selection of these groups of coefficients, the sequence control unit acts, through the address increment circuits 41, 42 and 43, to increment the integral parts of the colour-component signals in different combinations so that the store receives in succession: M, Y, C; M, Y, (C + 1); M, (Y + 1)C, and so on. For each of these combinations, the store 25 provides at its output the required yellow, magenta, cyan and black printer signals, i.e., whose values which, if applied to the output scanner, would give colour elements corresponding in the required manner to the points in three-dimensional colour space represented by the selected group of integral colour-component values. To take into account the part colour-component values, $y$, $m$ and $c$, for each input combination to the store, the corresponding output combination must be multiplied by the appropriate coefficient, as described above, and the products must be added together. The multiplication takes place in the interpolation multipliers 26*b* and the addition takes place in the accumulators 26*c*.

Although in the example shown in FIG. 6, the full product of the three 3-bit coefficients requires nine bits, it is rounded to the six most significant bits which control the interpolation multiplier 26*b* with sufficient accuracy.

The values at the outputs of the accumulators 26*c*, resulting from the eight store interrogations and multiplications, represent $\overline{M+m}$, $\overline{Y+y}$ and $\overline{C+c}$.

In the form shown, the store provides signals representing the black printer value for the combination of colour channel inputs and the yellow, magenta and cyan values extracted from the store represent the colour signals with undercolour removed. Corresponding multiplier control signals for the black printer are derived from the colour inputs $y$, $m$ and $c$.

The interpolation may in principle be performed by the computer but the provision of special-purpose hardware will generally be advantageous in operating speed and in freeing the computer for other tasks.

The store size and word lengths shown in FIG. 6 may of course be varied to suit the quality of work desired.

The invention is particularly advantageous in connection with scanners already employing digital apparatus for other purposes.

One example is an enlarging scanner constructed according to U.S. Pat. No. 3,541,245; the special-purpose digital circuits used to control traverse rates, input and output sampling rates and store addressing may with advantage be replaced with a small general-purpose digital computer performing the same functions. Only one computer is thus required in the whole machine, this being used to load the correction store in accordance with the present invention when setting up, and to control the scanning process during scanning.

It is sometimes advantageous for the store 25 to be split into two parts, each of which includes a part of the total correction required. As an example, if the colour information is to be stored on tape it requires less storage to store the three colour-component signals and to carry out that part of the colour signal processing which generates the black printer in the second part of the store which is effective only when the signals are extracted from the tape. In some cases a single store can be used for both these functions because the two stores would not be required to operate simultaneously.

I claim:

1. A method of reproducing a coloured original, including:

programming a digital computer to effect tone and colour correction of colour-component signals applied thereto and to provide tone and colour corrected output signals;

adjusting parameter-setting means to define parameters used by said digital computer in correcting said colour-component signals;

supplying said computer with a matrix of input signal combinations, each input signal representing a colour component and each combination representing a point in colour space, and transferring corresponding output signals from the computer to a store, whereby said store contains a matrix of tone and colour corrected signals corresponding to said input points in colour space;

scanning the original with a photo-electric scanner to obtain signals representing colour component densities of successively scanned elements of the original;

interrogating said store to derive tone and colour corrected store output signals corresponding to the signals from the said scanner; and using said signals from the store to control the treatment of an output surface on which the original is to be reproduced.

2. A method in accordance with claim 1, in which the signals representing the said color component densities constitute store addresses from which computed output values for those signals are obtained.

3. A method in accordance with claim 1, in which during setting of the parameter values output signals computed for the instantaneous parameter values are displayed for assessment.

4. A method in accordance with claim 1, in which the colour component signals are converted into digital form and the most significant digits of each signal are used as an input to the store, the remaining digits of each signal being applied to an interpolator receiving the store output.

5. Apparatus for use in the reproduction of a coloured image, including a photo-electric analysing scanner for deriving signals representing colour component densities of successively scanned elements of the original, an output scanner for treating successively scanned elements of an output surface in accordance with variations in an electric signal applied thereto, and signal-modifying means responsive to the signals from the analysing scanner to derive and to apply to the output scanner signals bearing a predetermined relationship to the input signals, the signal-modifying means including storage means for storing a matrix of output values, any of which can be extracted from the store in response to the corresponding signal from the analysing scanner, the apparatus further including, for entering the said matrix of output values into the store, a digital computer programmed to provide tone and colour correction of signals applied thereto, a parameter setting means for initially adjusting the values of parameters used by the computer, signal generating means for generating a matrix of input signals and for applying said input signals to said computer; and means for transferring tone and colour corrected output signals from said computer to said store.

6. Apparatus in accordance with claim 5, in which the output signals from said digital computer are stored in the store in locations having addresses corresponding to said signals from said signal generator, whereby by addressing the store with a signal derived from said scanner, the corresponding tone and colour-corrected signal is obtained at the output of said store.

7. Apparatus in accordance with claim 5, including analogue-digital converters for converting the colour component signals into digital form, and in which the store is connected to receive the digital colour component signals and address signals, the apparatus including an interpolator including means for incrementing addresses applied to the store by one, means for multiplying the store outputs for different combinations of input values and incremented input values by multiplying factors derived from the least significant part of the colour component signals, and means for accumulating a number of products of the multiplying factors and the store outputs to obtain the output value having the said relationship to the input value.

* * * * *